(12) United States Patent
Yamamoto et al.

(10) Patent No.: US 11,847,980 B2
(45) Date of Patent: Dec. 19, 2023

(54) HEAD-UP DISPLAY APPARATUS

(71) Applicant: MAXELL, LTD., Kyoto (JP)

(72) Inventors: Tomoki Yamamoto, Kyoto (JP); Toshinori Sugiyama, Kyoto (JP); Akio Misawa, Kyoto (JP); Nobutaka Amada, Kyoto (JP); Nagayasu Tsutsumi, Kyoto (JP); Yuji Fujita, Kyoto (JP); Souta Sato, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 17/801,808

(22) PCT Filed: Jan. 27, 2021

(86) PCT No.: PCT/JP2021/002891
§ 371 (c)(1),
(2) Date: Aug. 24, 2022

(87) PCT Pub. No.: WO2021/171885
PCT Pub. Date: Sep. 2, 2021

(65) Prior Publication Data
US 2023/0103912 A1    Apr. 6, 2023

(30) Foreign Application Priority Data

Feb. 28, 2020    (JP) ................. 2020-032959

(51) Int. Cl.
*G02B 27/01* (2006.01)
*G09G 3/34* (2006.01)
(Continued)

(52) U.S. Cl.
CPC ........... *G09G 3/3406* (2013.01); *B60K 35/00* (2013.01); *G01J 1/4204* (2013.01);
(Continued)

(58) Field of Classification Search
CPC ........... B60K 35/00; B60K 2370/1529; B60K 2370/334; G01J 1/4204; G02B 27/01;
(Continued)

(56) References Cited

U.S. PATENT DOCUMENTS

2015/0098029 A1\* 4/2015 Sato .................. G02F 1/133555
349/11
2016/0161742 A1 6/2016 Yonemoto
2017/0075118 A1\* 3/2017 Wall .................... G02B 27/0149

FOREIGN PATENT DOCUMENTS

JP    2015-31793 A    2/2015
JP    2015-152746 A    8/2015
(Continued)

OTHER PUBLICATIONS

International Search Report of PCT/JP2021/002891 dated Mar. 30, 2021.

*Primary Examiner* — Darlene M Ritchie
*Assistant Examiner* — Cory A Almeida
(74) *Attorney, Agent, or Firm* — Mattingly & Malur, PC

(57)    ABSTRACT

Provided is a head-up display apparatus capable of preventing damage due to sunlight and ensuring user convenience. A reflection mirror M1 reflects an image created by a display panel and projects it onto a display region. A solar radiation sensor detects a sunlight intensity when a position of sun exists within a predetermined detection range. A blocking mechanism forms a projected light path of an image between the display region and the display panel when being turned off, and blocks the projected light path of the image and an incident light path of the sunlight which is direction opposite thereto when being turned on. A protection processor controls ON/OFF of the blocking mechanism based on an estimated temperature of the display panel, which is estimated by using a sunlight intensity from the solar radiation
(Continued)

sensor, luminance of a light source, and an ambient temperature.

7 Claims, 15 Drawing Sheets

(51) Int. Cl.
    *B60K 35/00*     (2006.01)
    *G01J 1/42*     (2006.01)
    *H04N 9/31*     (2006.01)
    *G09G 3/36*     (2006.01)

(52) U.S. Cl.
    CPC ....... *G02B 27/0101* (2013.01); *H04N 9/3182* (2013.01); *H04N 9/3194* (2013.01); *B60K 2370/1529* (2019.05); *B60K 2370/334* (2019.05); *G02B 2027/0118* (2013.01); *G09G 3/36* (2013.01); *G09G 2310/08* (2013.01); *G09G 2320/041* (2013.01); *G09G 2320/064* (2013.01); *G09G 2330/06* (2013.01); *G09G 2354/00* (2013.01); *G09G 2360/144* (2013.01); *G09G 2380/10* (2013.01)

(58) Field of Classification Search
    CPC ........ G02B 27/0101; G02B 2027/0118; G09G 3/3406; G09G 3/36; G09G 2310/08; G09G 2320/041; G09G 2320/064; G09G 2330/06; G09G 2354/00; G09G 2360/144; G09G 2380/10
    See application file for complete search history.

(56) References Cited

FOREIGN PATENT DOCUMENTS

| | | |
|---|---|---|
| JP | 2019-89436 A | 6/2019 |
| KR | 10-2010-0033770 A | 3/2010 |

\* cited by examiner

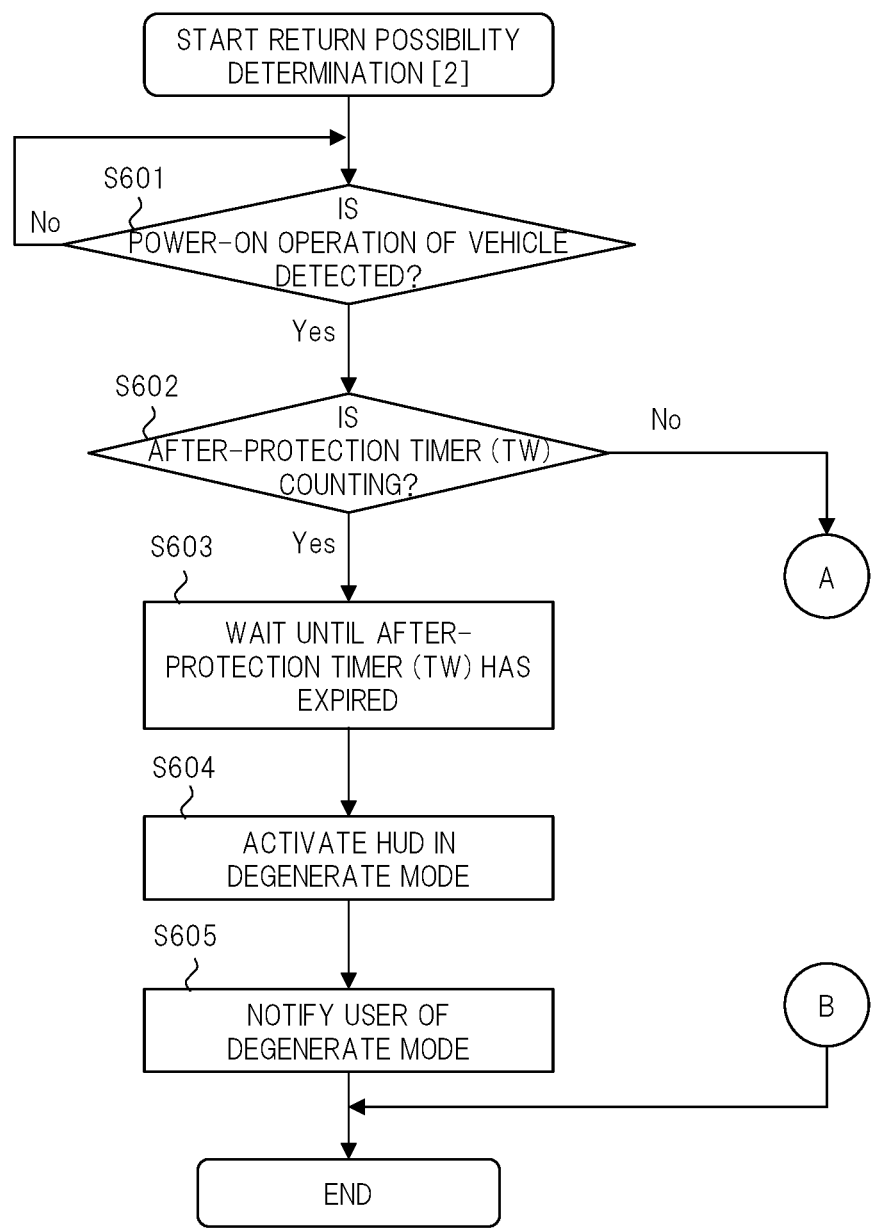

HEAD-UP DISPLAY APPARATUS

TECHNICAL FIELD

The present invention relates to a head-up display apparatus, for example, a technique effectively applicable to a head-up display apparatus using AR (Augmented Reality).

BACKGROUND ART

Patent Document 1 discloses a head-up display apparatus capable of effectively preventing intrusion of external light such as sunlight. The head-up display apparatus includes a shutter unit having a plurality of shutters, and changes a size of a transparent window portion formed in the shutter unit according to a size of a display image displayed by a display unit, thereby preventing the intrusion of external light and thus damage to the display unit.

RELATED ART DOCUMENTS

Patent Documents

Patent Document 1: Japanese Patent Application Laid-open No. 2015-152746

SUMMARY OF THE INVENTION

Problems to be Solved by the Invention

For example, a head-up display (Head Up Display, hereinafter may be referred to as "HUD") may be mounted on a vehicle represented by an automobile. The HUD projects, onto a windshield (front glass) and the like, various pieces of information such as: driving information such as a vehicle speed and an engine speed; and navigation information, and displays the information. By using the HUD, a driver can obtain the information necessary for driving without moving his/her visual line to a dashboard panel, a so-called instrument panel which is built in a dashboard. This makes it possible to contribute to safe driving.

Meanwhile, more recently, it is desired in the HUD to use the AR that adds various pieces of information to an existing object on a landscape and displays the information. In particular, the HUD using the AR (called AR-HUD) requires a wide display region. In order to widen the display region, it is necessary to widen an opening provided on a light path projected to the windshield from a display panel. Widening the opening makes it easier for sunlight to enter the display panel and, as a result, the display panel becomes easy to be damaged.

Thus, like Patent Document 1, a method of changing the size of the transparent window portion can be considered. However, even if the size of the transmissive window portion is changed according to the size of the display image, sufficient protection cannot always be achieved because a condensing point(s) of the sunlight may still occur on the display panel. For achieving the sufficient protection, it is desirable to completely block an incident light path of the sunlight. However, in this case, the projected optical path from the display panel is also blocked at the same time, and a time zone during which the HUD cannot be used occurs. However, even in this case, if the time zone during which the HUD cannot be used is shortened as much as possible, convenience of the user can be ensured to some extent.

The present invention has been made in view of the above, and one of purposes thereof is to provide a head-up display apparatus capable of preventing damage due to sunlight and ensuring user convenience.

The above and other objects and novel features of the present invention will become apparent from the description and accompanying drawings herein.

Means for Solving the Problems

A brief description of typical inventions disclosed in the present application is as follows.

A representative head-up apparatus projecting an image onto a display region of a windshield and allowing a driver of a vehicle to visually recognize a landscape on which the image is superimposed has a light source, a display panel, a reflection mirror, a solar radiation sensor, a blocking mechanism, and a protection processor. The display panel creates an image to be projected onto the display region by modulating the light from the light source. The reflection mirror reflects the image created by the display panel to project it onto the display region. The solar radiation sensor detects a sunlight intensity when a position of sun exists within a predetermined detection range. The blocking mechanism forms a projected light path of the image between the display region and the display panel when tuned OFF, and blocks the projected light path of the image and an incident light path of the sunlight which is a direction opposite to the projected light path when turned ON. The protection processor controls ON/OFF of the blocking mechanism based on an estimated temperature of the display panel, the estimated temperature being estimated by using the sunlight intensity from the solar radiation sensor, luminance of the light source, and an ambient temperature.

Effects of the Invention

If an effect(s) obtained by the representative inventions disclosed in the present application is explained, the head-up display apparatus can prevent damage due to sunlight and ensure user convenience.

BRIEF DESCRIPTION OF THE DRAWINGS

FIG. 14A is a flowchart showing an example of a processing content of return possibility determination [2] in FIG. 11;

DETAILED DESCRIPTION OF PREFERRED EMBODIMENTS

Figure 1:
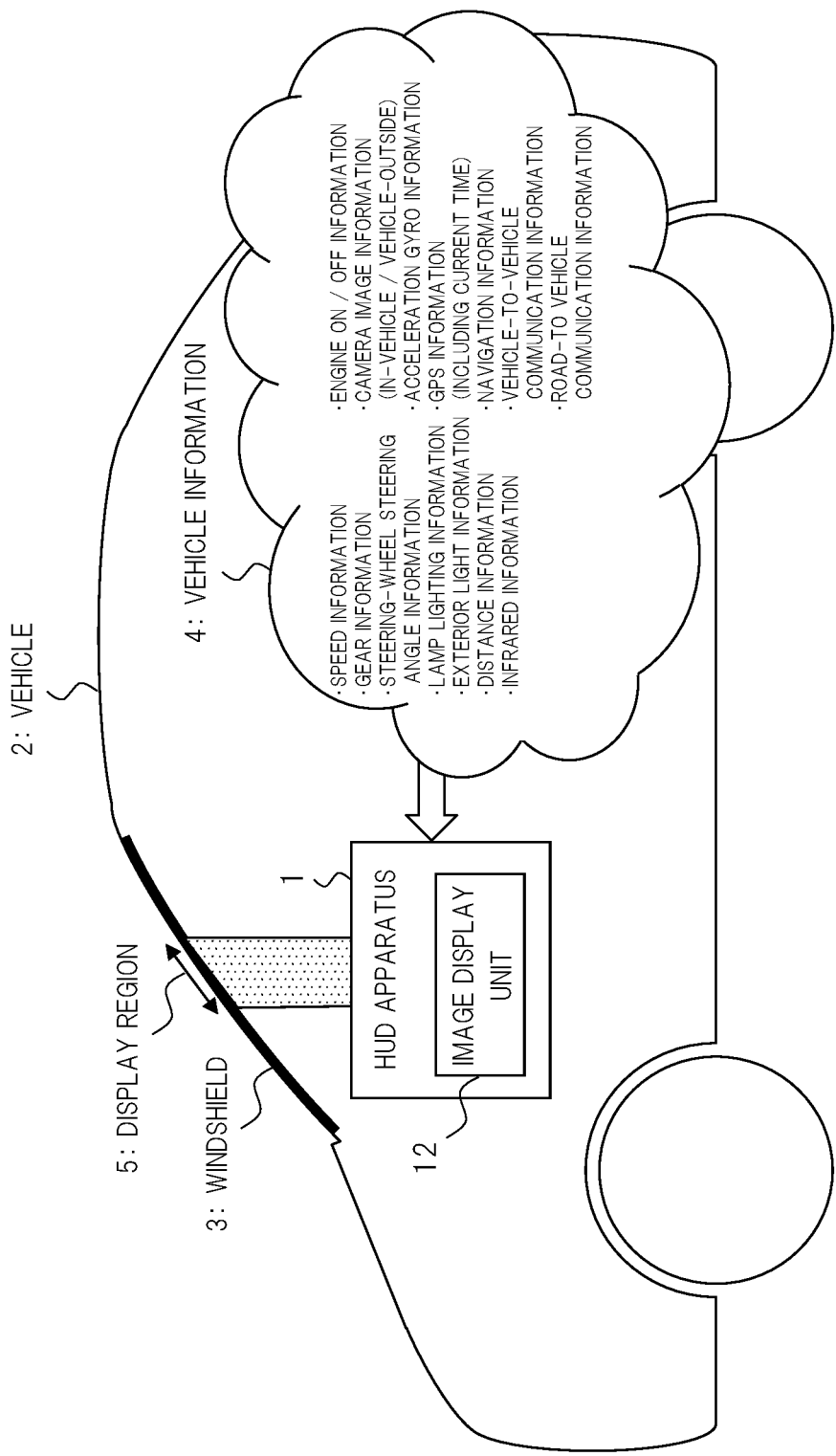
FIG. 1 is a schematic view showing a configuration example of a vehicle which has mounted a head-up display apparatus according to one embodiment of the present invention.

Hereinafter, embodiments of the present invention will be described in detail with reference to the drawings. Incidentally, in all the drawings for explaining the embodiments, in principle, the same members are denoted by the same reference numerals, and a repetitive description thereof will be omitted.

<<Outline of HUD Apparatus>>

FIG. 1 is a schematic view showing a configuration example of a vehicle which has mounted a head-up display apparatus according to one embodiment of the present invention. A head-up display (HUD) apparatus 1 of FIG. 1 is mounted on a vehicle 2. The vehicle 2 is typically an automobile, but is not necessarily limited to this, and may be a railroad vehicle or the like in some cases. The HUD apparatus 1 acquires vehicle information 4 from various sensors installed in respective parts of the vehicle 2. The various sensors, for example, detect various events that occur in the vehicle 2, and periodically detect values of various parameters related to a traveling situation.

The vehicle information 4 includes, for example, speed information and gear information of the vehicle 2, steering angle information, lamp lighting information, external light information, distance information, infrared information, engine ON/OFF information, camera image information inside and outside the vehicle, acceleration gyro information, GPS (Global Positioning System) information, navigation information, vehicle-to-vehicle communication information, road-to-vehicle communication information, and the like. The GPS information also includes information on current time. Based on such vehicle information 4, the HUD apparatus 1 uses the image display unit 12 to project a projected image onto a display region 5 of the windshield 3. Consequently, the HUD apparatus 1 makes a driver of the vehicle 2 visually recognize a landscape(s) on which the projected image is superimposed.

Figure 2:
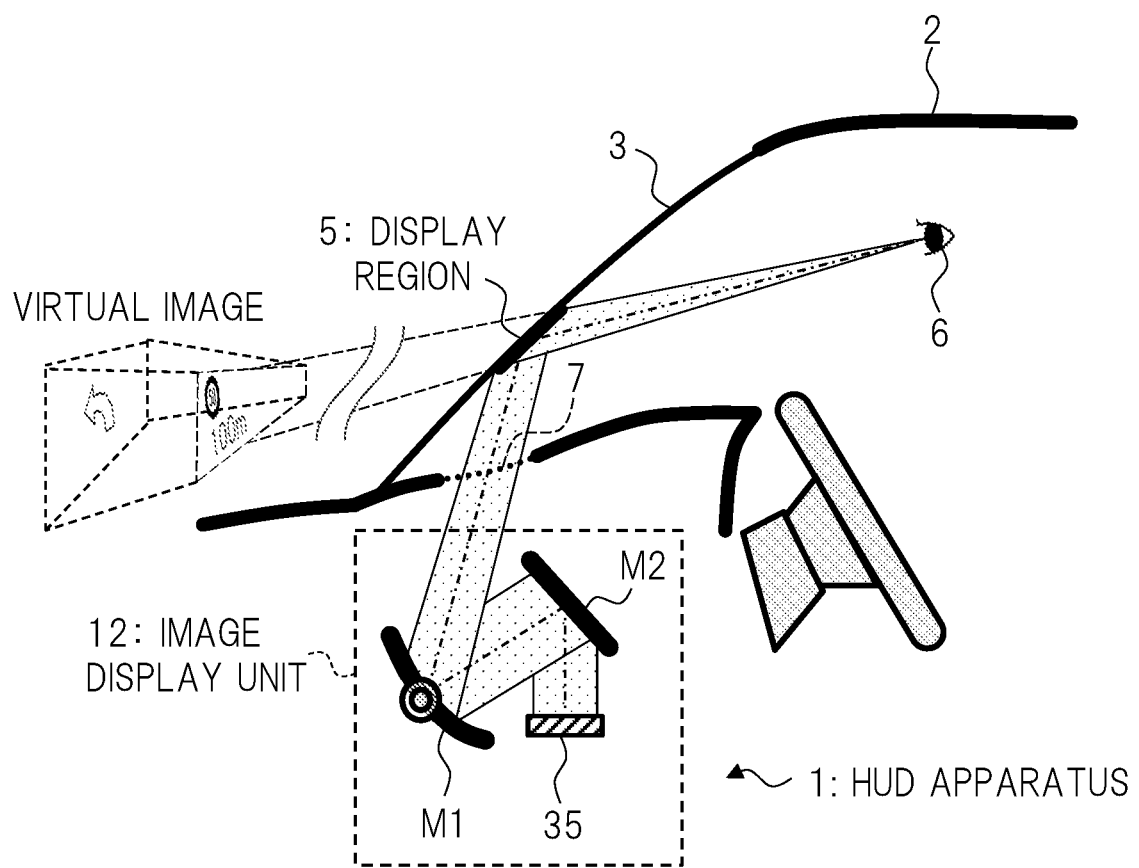
FIG. 2 is a schematic view showing a configuration example around an image display unit in FIG. 1.

FIG. 2 is a schematic view showing a configuration example around the image display unit in FIG. 1. The image display unit 12 shown in FIG. 2 includes an image display 35 and reflection mirrors M1, M2. The reflection mirror M1 is, for example, a concave mirror (magnifying glass). The image display 35 is, for example, a projector, an LCD (Liquid Crystal Display), or the like, and creates and displays an image based on image data instructed by a controller. The reflection mirrors M1, M2 are, for example, free-form curved mirrors or mirrors each having a shape asymmetric to an optical axis. The reflection mirror M2 reflects the image created (displayed) by the image display 35. The reflection mirror M1 reflects and magnifies the image reflected by the reflection mirror M2, and projects it onto the display region 5 through an opening 7.

Consequently, the driver 6 visually recognizes the projected image, which has been projected on the display region 5, as a virtual image ahead of the transparent windshield 3 in a form of being superimposed on landscapes (roads, buildings, people, etc.) outside the vehicle. The projected image (virtual image) includes various things such as a road sign, a current speed of an own vehicle, and various pieces of information (AR information) added to an object(s) in the landscape. Incidentally, in FIG. 2, for example, a position of the display region 5 on the windshield 3 can be adjusted by adjusting an installation angle of the reflection mirror M1, and a position of the virtual image visually recognized by the driver 6 can be adjusted in an up-and-down (vertical) direction. In addition, for example, by a further increase in an area of the reflection mirror M1 or the like, the area of the display region 5 can be expanded, and more information can be projected onto the display region 5. This makes it possible to realize an AR function that adds various pieces of information to the object on the landscape and displays it.

Figure 3:
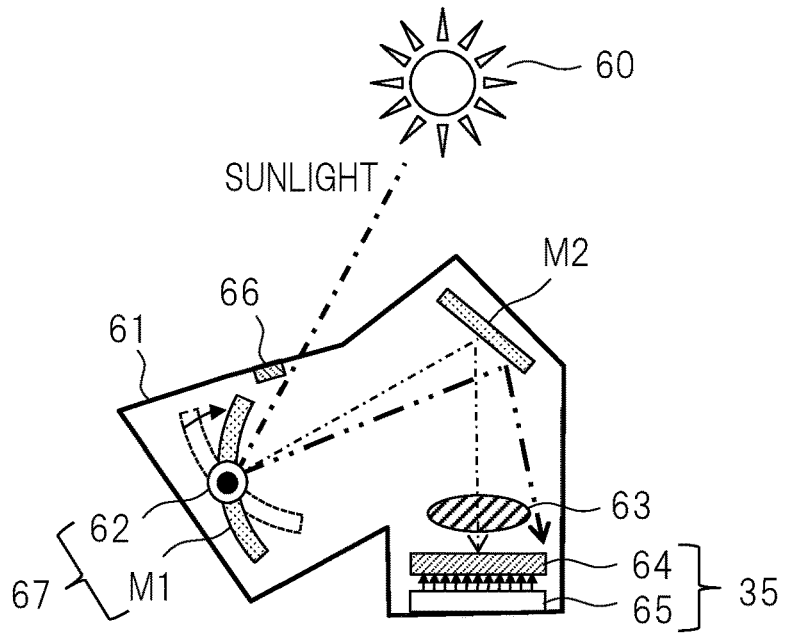
FIG. 3 is a view showing a more detailed configuration example and a more detailed operation example around the image display unit in FIG. 2.
Figure 4:
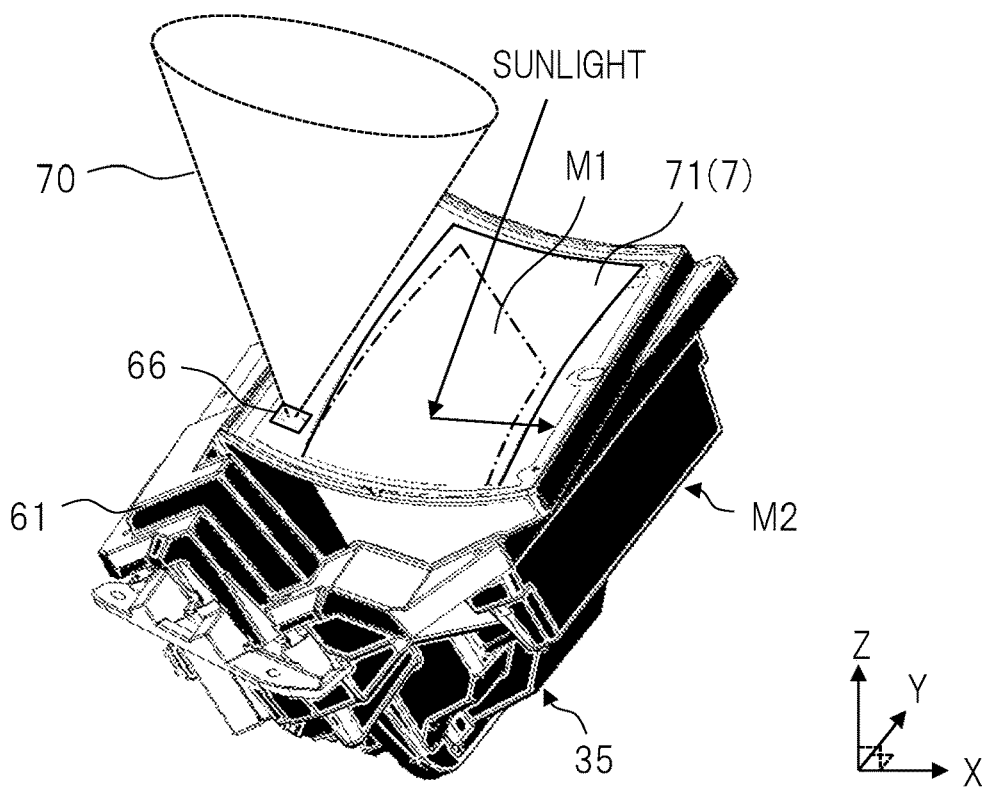
FIG. 4 is a perspective view showing an outline example of the HUD apparatus including the image display unit of FIG. 3.

FIG. 3 is a view showing a more detailed configuration example and a more detailed operation example around the image display unit in FIG. 2. FIG. 4 is a perspective view showing an outline example of the HUD apparatus including the image display unit of FIG. 3. As shown in FIG. 3, the image display 35 of FIG. 2 specifically has a light source 65 that emits light, and a display panel 64 that creates (displays) an image(s) projected on the display region 5 by modulating light from the light source 65. The light source 65 is typically an LED (Light Emitting Diode) light source. The display panel 64 is typically a liquid crystal panel (LCD), and modulates transmittance of light from the light source 65 for each pixel according to the inputted image data.

Further, a condenser lens 63 is installed between the display panel 64 and the reflection mirror M2. Consequently, sunlight from the sun 60 may be condensed on the display panel 64 via the reflection mirrors M1, M2 and the condenser lens 63. Thus, a drive mechanism 62 for changing an installation angle of the reflection mirror M1 is attached to the reflection mirror M1. The drive mechanism 62 includes a stepping motor and the like. The reflection mirror M1 to which the drive mechanism 62 is attached constitutes a blocking mechanism 67.

The blocking mechanism 67 forms a projected optical path of an image between the display region 5 and the display panel 64 when it is turned off, and blocks the projected optical path of the image and an incident optical path of the sunlight which is a direction opposite thereto when it is turned on. Specifically, as shown in FIG. 3, when being turned on, the blocking mechanism 67 changes the installation angle of the reflection mirror M1 via the drive mechanism 62 to change the optical path, thereby blocking the incident optical path of the sunlight directed toward the display panel 64 and, as a result, blocking the projected optical path of the image.

Incidentally, the blocking mechanism 67 is not necessarily limited to such a configuration, has only to be capable of blocking the incident optical path of the sunlight, and may be, for example, a method of changing the installation angle of the reflection mirror M2, or a method of separately inserting a slide-type shielding plate or the like on the incident optical path of the sunlight. However, as described above, the drive mechanism 62 in the blocking mechanism 67 of FIG. 3 can be used also in adjusting the position of the virtual image. Consequently, using the method of FIG. 3 makes it possible to achieve a combination of parts (components).

Further, in FIG. 3, the image display 35, the reflection mirror M1 with the drive mechanism 62, the reflection mirror M2, and the condenser lens 63 are accommodated in a housing 61 together with various controllers (not shown). Furthermore, a solar radiation sensor 66 for detecting a position of the sun 60 and a sunlight intensity is installed in the housing 61. Incidentally, although not shown, a temperature sensor for detecting an ambient temperature Ta may further be installed in the housing 61. However, for example, when the ambient temperature Ta is acquired from the temperature sensor installed in the vehicle 2, the temperature sensor does not need to be installed in the housing 61.

In FIG. 4, an opening 7 is formed in the housing 61, and a transparent color cover member 71 called a glare trap or the like is installed in the opening 7. As shown in FIG. 3, the reflection mirror M1 is installed in the housing 61 so as to reflect the light from the reflection mirror M2 toward the cover member 71 (opening 7). Further, in the housing 61, for example, the solar radiation sensor 66 is installed at a periphery or the like of the cover member 71 or the like.

In detail, the solar radiation sensor 66 detects the sunlight intensity when a position (azimuth direction and elevation angle) of the sun 60 is present within a sunlight detection range 70, as shown in FIG. 4. For example, depending on the incident angle of the sunlight onto the reflection mirror M1 (and thus the position of the sun 60), the incident light path of the sunlight deviates from the display panel 64, so that the possibility of damage to the display panel 64 can be ignored. That is, the possibility of the damage can be ignored depending on seasons, time zones, postures of the vehicle 2, and the like.

A range of the incident angle at which the possibility of the damage can be ignored, in other words, a range of the incident angle at which the possibility of the damage cannot be ignored, can be determined in advance based on optical conditions of the optical system including the reflection mirrors M1, M2 and the condenser lens 63 (for example, installation positions, installation angles, sizes, and the like). Thus, the solar radiation sensor 66 detects the sunlight intensity within the sunlight detection range 70 by regarding, as the sunlight detection range 70, a range of the incident angle (position of the sun 60) that cannot ignore the possibility of the damage to the display panel 64.

As a specific configuration of the solar radiation sensor 66, for example, by appropriately installing an opening, a shielding plate, or the like around a light receiving element such as a photodiode, given is such a method as to physically limit the incident angle of the sunlight incident on the light receiving element. Alternatively, by using a known solar radiation sensor capable of detecting both the position of the sun 60 and the sunlight intensity (for example, a sensor that detects the position by a light intensity balance of four light receiving elements), may be a method of performing a signal processing in combination with position information and sunlight intensity information that have been detected.

<<Configuration of Control System of HUD Apparatus>>

Figure 5:
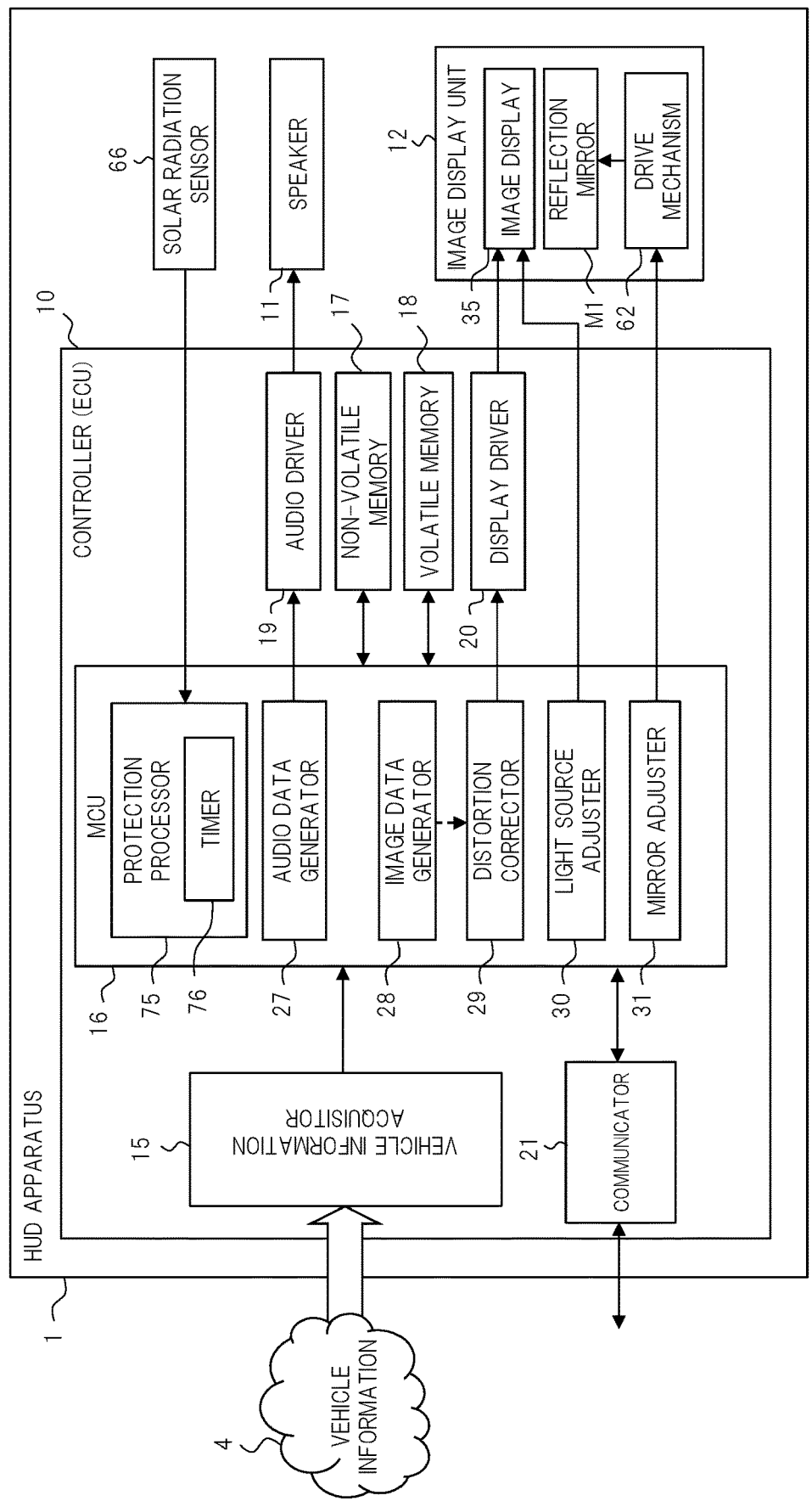
FIG. 5 is a block diagram showing a configuration example of a main part of a control system included in the head-up display apparatus of FIG. 1.
Figure 6:
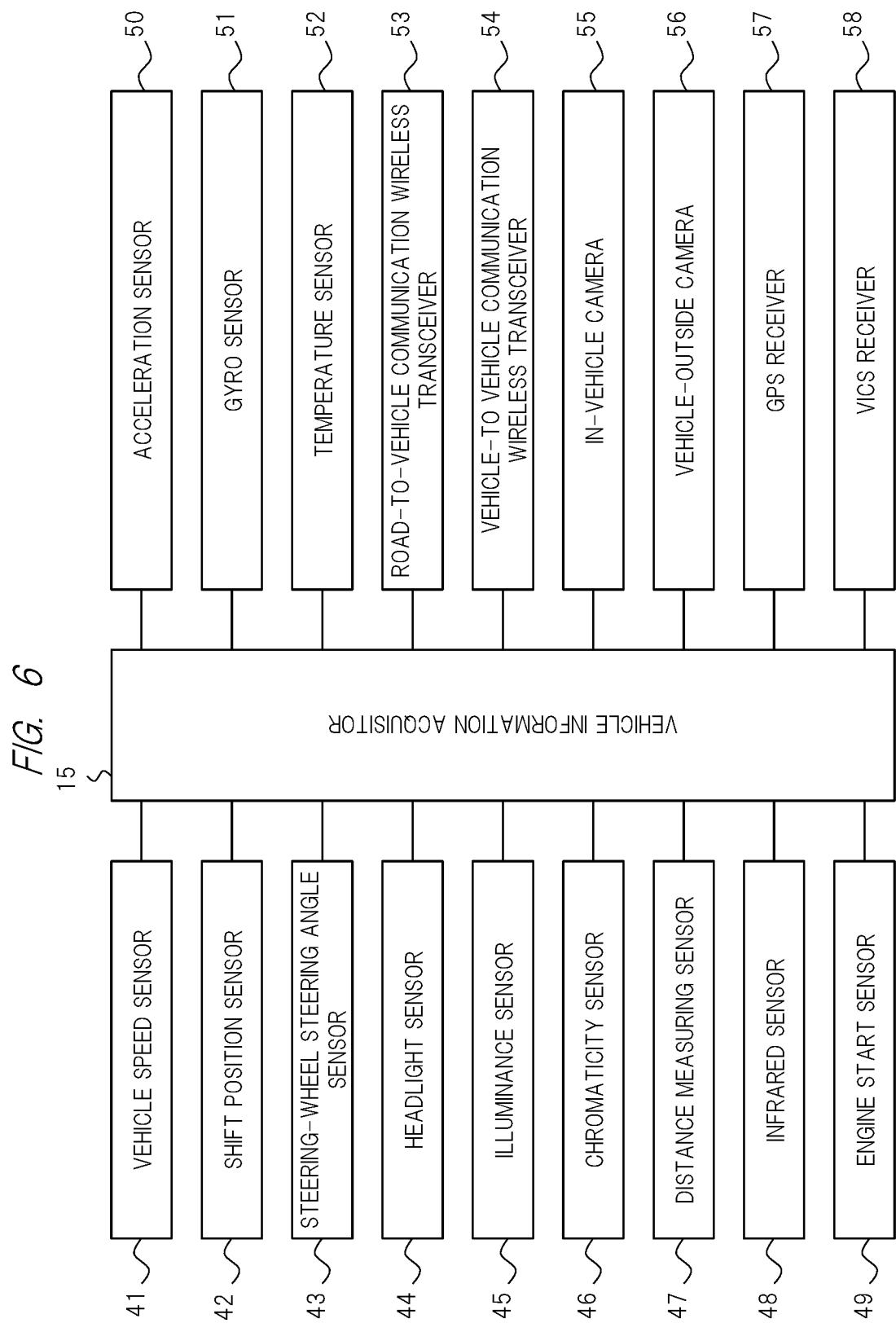
FIG. 6 is a block diagram showing a configuration example of a portion related to acquisition of vehicle information in FIG. 5.

FIG. 5 is a block diagram showing a configuration example of a main part of a control system included in the head-up display apparatus of FIG. 1. FIG. 6 is a block diagram showing a configuration example of a portion related to acquisition of vehicle information in FIG. 5. The head-up display (HUD) apparatus 1 shown in FIG. 5 includes a controller (ECU: Electronic Control Unit) 10, a speaker 11, an image display unit 12, and a solar radiation sensor 66 described in FIG. 3. The image display unit 12 includes an image display 35, a reflection mirror M1 with a drive mechanism 62, and the like as shown in FIG. 3.

The controller 10 mainly controls display of the projected image (virtual image) in the HUD apparatus 1, controls an audio output, and the like. The controller 10 is configured by, for example, a wiring board and the like, and the wiring board is mounted in, for example, the housing 61 of FIG. 4. The controller 10 includes a vehicle information acquisitor 15, a microcontroller (MCU) 16, a non-volatile memory 17, a volatile memory 18, an audio driver 19, a display driver 20, a communicator 21, and the like that are mounted on the wiring board. As is widely known, the MCU 16 has various peripheral functions in addition to a CPU (Central Processing Unit). Therefore, each block other than the MCU 16 in the controller 10 of FIG. 5 may be appropriately mounted in the MCU 16.

The vehicle information acquisitor 15 is, for example, a CAN (Controller Area Network) interface, a LIN (Local Interconnect Network) interface, or the like, and acquires the vehicle information 4 based on a communication protocol such as CAN or LIN. As shown in FIG. 6, the vehicle information 4 is generated by information acquisition devices such as various sensors connected to the vehicle information acquisitor 15. FIG. 6 shows an example of various information acquisition devices.

For example, a vehicle speed sensor 41 detects a speed of the vehicle 2 in FIG. 1, and generates speed information as a detection result. A shift position sensor 42 detects a current gear, and generates gear information as a detection result. A steering-wheel steering angle sensor 43 detects a current steering-wheel steering angle, and generates steering-wheel steering angle information as a detection result. A headlight sensor 44 detects ON/OFF of a headlight, and generates lamp lighting information as a detection result.

An illuminance sensor 45 and a chromaticity sensor 46 detect external light, and generate external light information as a detection result. A distance measuring sensor 47 detects a distance between the vehicle 2 and an external object, and generates distance measuring information as a detection result. An infrared sensor 48 detects presence/absence of an object and a distance of an object that lie at a short distance of the vehicle 2, and generates infrared information as a detection result. An engine start sensor 49 detects ON/OFF of an engine, and generates ON/OFF information as a detection result.

An acceleration sensor 50 and a gyro sensor 51 detect acceleration and angular velocity of the vehicle 2, respectively, and generate acceleration gyro information representing a posture and a behavior of the vehicle 2 as a detection result. A temperature sensor 52 detects temperatures inside and outside the vehicle, and generates temperature information as a detection result. For example, the temperature sensor 52 can detect an ambient temperature Ta of the HUD apparatus 1. However, as described in FIG. 4, the temperature sensor may be separately mounted in the HUD apparatus 1.

A road-to-vehicle communication wireless transceiver 53 generates road-to-vehicle communication information by road-to-vehicle communication between the vehicle 2 and a road, a sign, a signal, or the like. A vehicle-to-vehicle communication wireless transceiver 54 generates vehicle-to-vehicle communication information by vehicle-to-vehicle communication between the vehicle 2 and another vehicle in the vicinity thereof. An in-vehicle camera 55 and a vehicle-outside camera 56 generate camera image information inside the vehicle and camera image information outside the vehicle by photographing an inside and outside of the vehicle, respectively. Specifically, the in-vehicle camera 55 is, for example, a DMS (Driver Monitoring System) camera or the like that captures a posture, an eye position, a movement, and the like of the driver 6 in FIG. 2. In this case, by analyzing the captured image, fatigue status, the position of the visual line, and the like of the driver 6 can be grasped.

Meanwhile, the vehicle-outside camera 56 captures, for example, surrounding conditions such as a front and a back of the vehicle 2. In this case, analyzing the captured image makes it possible to grasp: presence or absence of obstacles such as other vehicles and people existing in the vicinity thereof; road surface conditions such as buildings and terrains, rain and snow, freezing, and unevenness; road signs; and the like. Further, the vehicle-outside camera 56 also includes, for example, a drive recorder that records a traveling situation as an image.

A GPS receiver 57 generates GPS information obtained by receiving a GPS signal. For example, the GPS receiver 57 makes it possible to acquire the current time. A VICS (Vehicle Information and Communication System, registered trademark) receiver 58 generates VICS information obtained by receiving a VICS signal. The GPS receiver 57 and the VICS receiver 58 may be provided as parts of a navigation system. Incidentally, various information acquisition devices shown in FIG. 6 can be appropriately deleted, add other types of devices, or be replaced with other types of devices.

In FIG. 5, the MCU 16 receives such vehicle information 4 via the vehicle information acquisitor 15, and generates, based on the vehicle information 4 and the like, audio data directed toward the speaker 11, image data directed toward the image display 35, and the like. Specifically, the MCU 16 includes an audio data generator 27, an image data generator 28, a distortion corrector 29, a light source adjuster 30, a mirror adjuster 31, and a protection processor 75. Each of these parts is mainly implemented by a CPU executing a program(s) stored in the non-volatile memory 17 or the volatile memory 18.

The audio data generator 27 generates audio data based on the vehicle information 4 and the like if necessary. The audio data is generated, for example, in a case of performing voice guidance of a navigation system, issuing a warning to the driver 6 by the AR function, or the like. An audio driver 19 drives the speaker 11 based on the audio data, and causes the speaker 11 to output voice.

The image data generator 28 generates image data for determining a display content of the projected image projected on the display region 5 of FIG. 2 or the like based on the vehicle information 4 or the like. The distortion corrector 29 generates corrected image data in which distortion correction is applied to the image data generated by the image data generator 28. Specifically, as shown in FIG. 2, the distortion corrector 29 corrects distortion of an image(s) caused by curvature of the windshield 3 when the image from the image display 35 is projected onto the display region 5.

The display driver 20 drives each display element (pixel) included in the display panel 64 in the image display 35 based on the corrected image data from the distortion corrector 29. Consequently, the image display 35 creates (displays) an image to be projected onto the display region 5 based on the corrected image data. The light source adjuster 30 controls brightness of the light source 65 in the image display 35. When a position of the display region 5 in the windshield 3 needs to be adjusted, the mirror adjuster 31 changes the installation angle of the reflection mirror M1 in the image display unit 12 via the drive mechanism 62. Further, as described in FIG. 3, the mirror adjuster 31 changes the installation angle of the reflection mirror M1 via the drive mechanism 62 so as to increase to some extent even in blocking the incident optical path of the sunlight.

The protection processor 75 includes a timer 76 and, although details thereof are described later, performs various protective operations based on the estimated temperature of the display panel 64 in the image display 35, the estimated temperature being estimated by mainly using: the sunlight intensity from the solar radiation sensor 66; the ambient temperature Ta from the temperature sensor 52 and the like in FIG. 6; and luminance of the light source in the light source adjuster 30. The non-volatile memory 17 mainly stores in advance a program executed by the CPU in the MCU 16, setting parameters used in a processing of each part in the MCU 16, specified audio data and video data, etc.

The volatile memory 18 mainly holds the acquired vehicle information 4 and various pieces of data used in a processing process of each part in the MCU 16 as appropriate. The communicator 21 communicates with an outside of the HUD apparatus 1 based on a communication protocol such as CAN or LIN. The communicator 21 may be integrated with the vehicle information acquisitor 15. Incidentally, each part in the controller (ECU) 10 of FIG. 4 may be appropriately mounted on an FPGA (Field Programmable Gate Array) or the like.

<<Schematic Operation of Protection Processor>>

Figure 7:
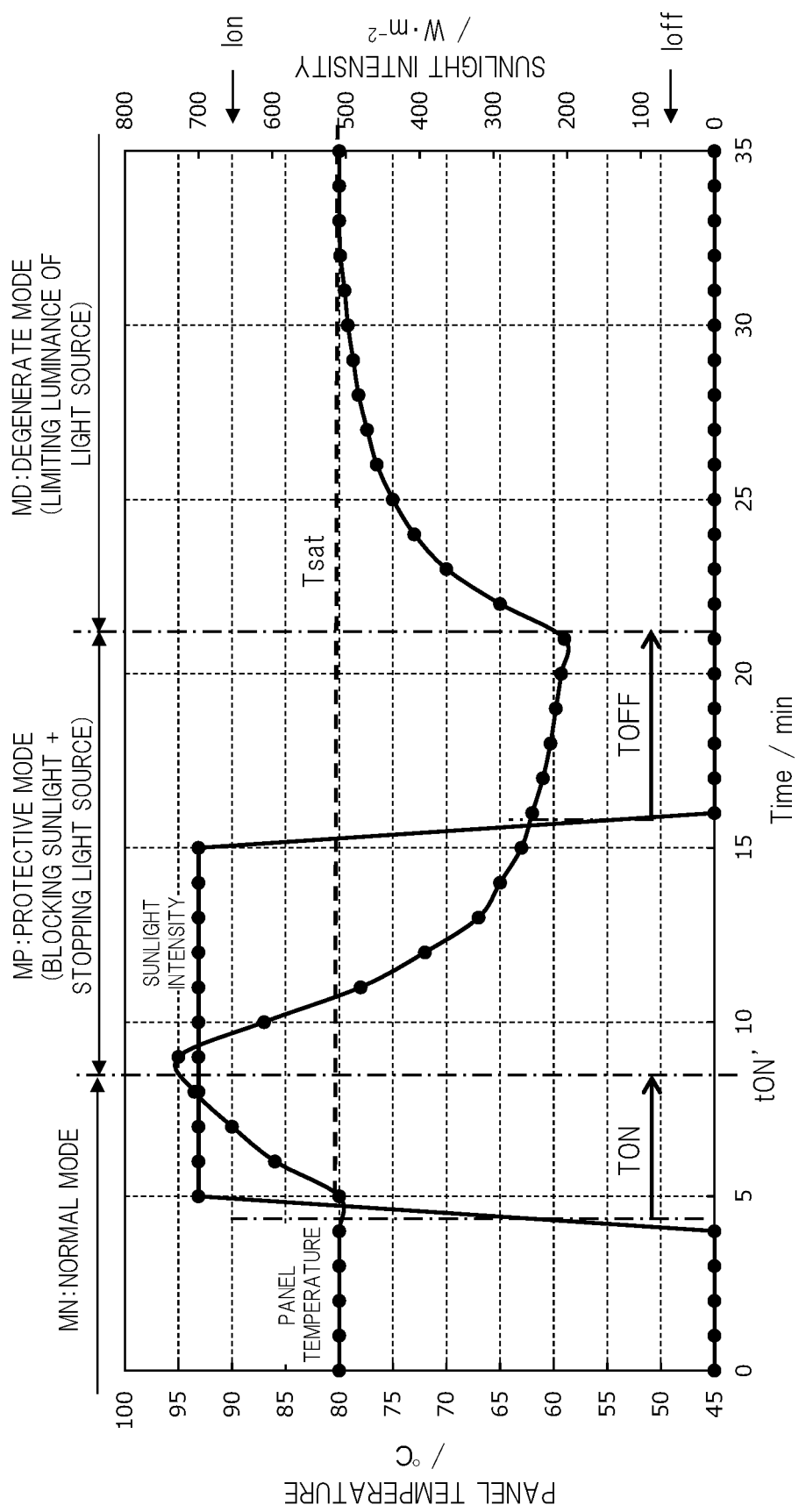
FIG. 7 is a schematic view showing an operation example of a main part of a protection processor in FIG. 5.

FIG. 7 is a schematic view showing an operation example of a main part of the protection processor in FIG. 5. In FIG. 7, provided as operational modes are a normal mode MN, a protective mode MP, and a degenerate mode MD. First, in the normal mode MN, when no sunlight is incident (for example, when the sunlight intensity by the solar radiation sensor 66 is zero), a temperature of the display panel 64 in a steady state is determined by luminance L of the light source 65 and the ambient temperature Ta. The temperature of the display panel 64 in a steady state when no sunlight is incident is called a saturation temperature Tsat. The saturation temperature Tsat is 80° C. in this example. In the normal mode MN, the blocking mechanism 67 of FIG. 3 is turned off (that is, the installation angle of the reflection mirror M1 is in an initial state), and the light source 65 is driven in a state where the luminance L is not limited.

Meanwhile, when the sunlight is incident (when the sunlight intensity by the solar radiation sensor 66 is non-zero), the temperature of the display panel 64 rises according to the sunlight intensity. The protection processor 75 is shifted from the normal mode MN to the protective mode MP at a time point (protection-on time tON') when the temperature of the display panel 64 reaches a protection start temperature (95° C. in this example). In the protective mode MP, the blocking mechanism 67 is turned on (that is, the installation angle of the reflection mirror M1 is in a changed state), and the driving of the light source 65 is stopped.

Figure 8:
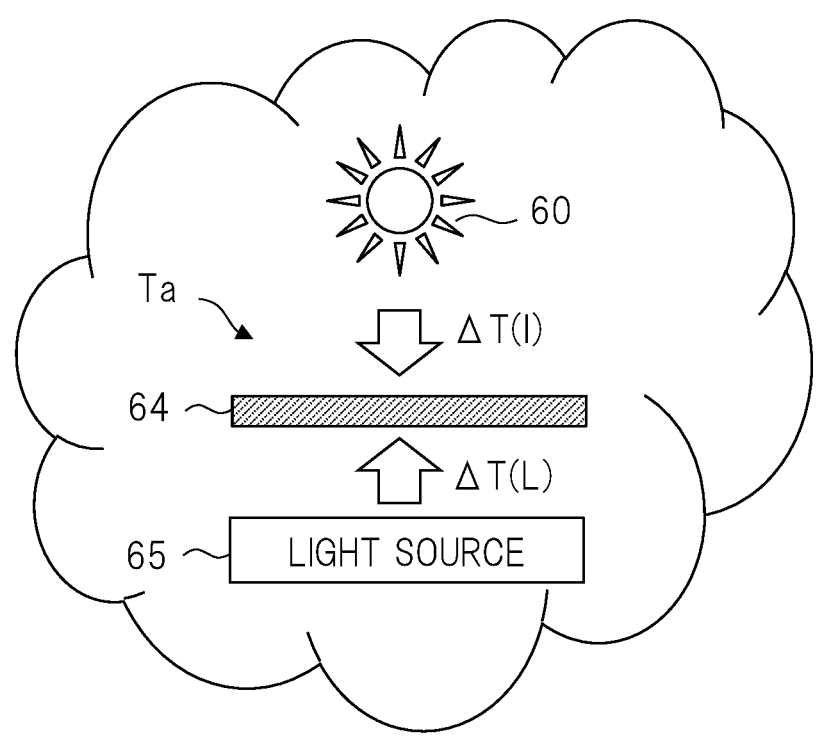
FIG. 8 is a diagram for explaining an estimated temperature of a display panel used in the protection processor in FIG. 5.

Here, in each operational mode, it may be difficult to actually measure the temperature of the display panel 64 by the temperature sensor or the like because the display panel 64 has a property in which it is difficult to mount a component(s) thereon. Thus, the protection processor 75 controls the operational modes including turning on and off the blocking mechanism 67 based on the estimated temperature of the display panel 64 that is estimated by using the sunlight intensity from the solar radiation sensor 66, the luminance of the light source 65, and the ambient temperature Ta. FIG. 8 is a diagram for explaining the estimated temperature of the display panel used in the protection processor in FIG. 5.

As shown in FIG. 8, the saturation temperature Tsat when the sunlight in FIG. 7 is not incident is estimated by using, for example, a temperature rise amount ΔT (L) corresponding to the luminance L of the light source 65 and the ambient temperature Ta. The temperature rise amount ΔT (L) is generated by the display panel 64 absorbing energy of the light from the light source 65. However, when a distance between the display panel 64 and the light source 65 is close to some extent, heat radiation due to heat generation of the light source 65 is also taken into consideration. Further, the temperature of the display panel 64 when the sunlight is incident is estimated by adding the temperature rise amount (or a temperature rise rate in addition thereto) ΔT (1) according to a sunlight intensity 1 with reference to the saturation temperature Tsat.

This makes it possible to calculate in advance a required time until the temperature of the display panel 64 reaches a protection start temperature (for example, 95° C.) from the saturation temperature Tsat on the premise of a constant sunlight intensity. Then, based on the constant sunlight intensity and the required time, an on-intensity Ion and a continuous detection time TON in FIG. 7 can be determined. At this time, the continuous detection time TON may be a function of the ambient temperature Ta and the luminance L of the light source 65. As an actual operation, the protection processor 75: considers that the protection start temperature has been reached when the sunlight intensity is in a state of the on-intensity Ion or more (higher) and the state continues for an interval of the continuous detection time TON; and shifts from the normal mode MN to protective mode MP. As a result, the temperature of the display panel 64 decreases.

Meanwhile, the protection processor 75 is shifted from the protective mode MP to the degenerate mode MD when the sunlight intensity is in a state of the off-intensity Ioff or less predetermined by the sunlight intensity and the state continues for an interval of a predetermined continuous undetected time TOFF. In the degenerate mode MD, the blocking mechanism 67 is turned off (that is, the installation angle of the reflection mirror M1 is in the initial state), and the light source 65 is driven in a state where the maximum luminance Lmax is limited to a value lower than that in the normal mode MN.

For example, the maximum luminance Lmax in the degenerate mode MD is limited to 70% or the like of the maximum luminance (Lmax (Ta)) in the normal mode MN. At this time, the protection processor 75 determines, for example, the maximum luminance (Lmax (Ta)) in the normal mode MN according to the ambient temperature Ta. Specifically, for example in FIG. 8, the protection processor 75 determines the maximum luminance (Lmax (Ta)) so that an addition result of the temperature rise amount ΔT (L) and the ambient temperature Ta becomes constant. Along with this, the protection processor 75 also leads to variably controlling the maximum luminance Lmax in the degenerate mode MD according to the ambient temperature Ta. As a specific implementing method, for example, given is a method of calculating a relationship between the ambient temperature Ta and the maximum luminance Lmax on the non-volatile memory 17 of FIG. 5 or a method of implementing the relationship as a table.

By providing such a degenerate mode MD, the temperature of the display panel 64 can gradually come closer toward the saturation temperature Tsat as shown in FIG. 7. Meanwhile, if the luminance is not limited (that is, when the protective mode MP is directly shifted to the normal mode MN), an overshoot exceeding the saturation temperature Tsat may actually occur at the temperature of the display panel 64. Use of the calculation as shown in FIG. 8 can estimate the temperature in the steady state, but it is not easy to estimate a temperature in transient states such as an amount of overshoot as mentioned above and its convergence time.

Therefore, when the overshoot occurs, a period in which the temperature of the display panel 64 cannot be estimated with high accuracy leads to occurring consequently. Specifically, there may be periods when the actual temperature is slightly higher than the estimated temperature. Then, in a process of performing control based on the estimated temperature, there is the possibility that the temperature of the display panel 64 exceeds an upper limit temperature in specifications. For example, if the protective mode MP occurs with high frequency to some degree, errors may accumulate and it may be difficult to control the temperature of the display panel 64. Thus, in order to eliminate an error factor that may occur in the control based on the estimated temperature without causing such an overshoot, it becomes beneficial to provide the degenerate mode MD that limits the maximum luminance Lmax.

Incidentally, in a case of an LED light source, the luminance of the light source 65 is controlled by a PWM duty ratio (=LED on-time/PWM cycle). In this case, the protection processor 75 of FIG. 5 limits the maximum value of the PWM duty ratio via the light source adjuster 30. Further, the continuous undetected time TOFF is, for example, about 3 to 10 minutes, typically 5 minutes or the like. This can be determined, for example, by an experiment or the like. Specifically, it has ascertained by an experiment that the temperature of the display panel 64 becomes the saturation temperature Tsat or less when the protective processor is shifted to the protective mode MP from the protection start temperature (for example, 95° C.) and if the protective mode MP is continued for at least 5 minutes.

That is, in FIG. 7, when the sunlight intensity becomes zero at the same time as the protection on-time tON' and if the protective mode MP is continued for 5 minutes from the protection on-time tO', the temperature of the display panel 64 becomes the saturation temperature Tsat or less. That the temperature of the display panel 64 is the saturation temperature Tsat or less means that the protective mode MP may be canceled. However, if a method of canceling the protective mode MP 5 minutes after the protection on-time tON' with reference to the protection on-time tON' is used and when the solar intensity is still maintained at a high value after 5 minutes, it becomes necessary to be quickly shifted to the protective mode MP. Thus, it is beneficial to cancel the protective mode MP on the premise of the off-intensity Ioff and the continuous undetected time TOFF.

Further, in this example, the estimated temperature of the display panel 64 has been used in the form of being indirectly reflected by: the on-intensity Ion and the continuous detected time TON in being shifted to the protective mode MP; set luminance in the degenerate mode MD; and the like. However, in some cases, the protection processor 75 may control the operative mode by directly using the calculated estimated temperature while sequentially calculating the estimated temperature of the display panel 64 by the calculation as described in FIG. 8. However, in this case, since the processing load of the protection processor 75 increases, it is beneficial to use the method as shown in FIG. 7 from this viewpoint.

<<Detailed Operation of Protection Processor>>

Figure 9:
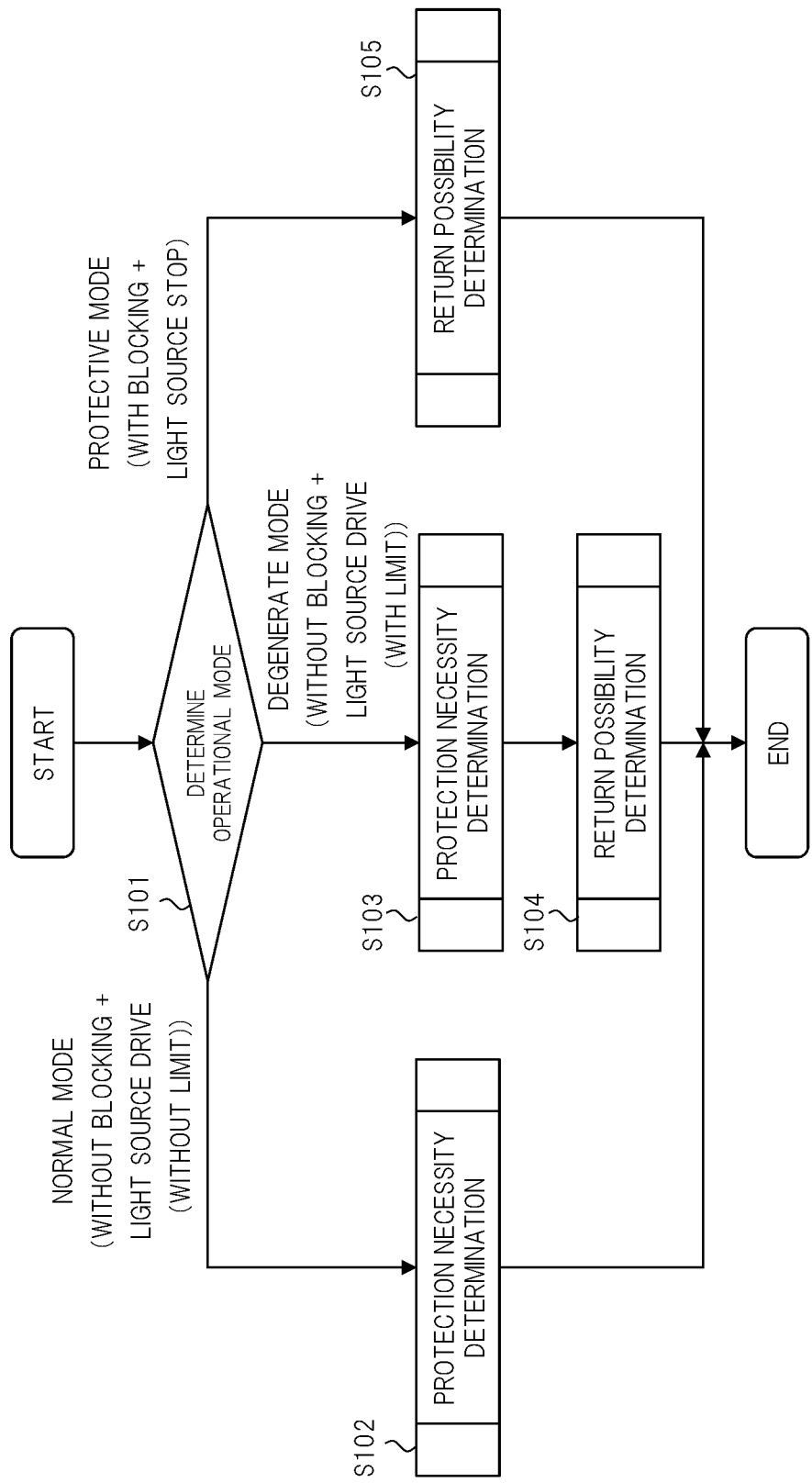
FIG. 9 is a flowchart showing an example of a processing content of the protection processor in FIG. 5.
Figure 10:
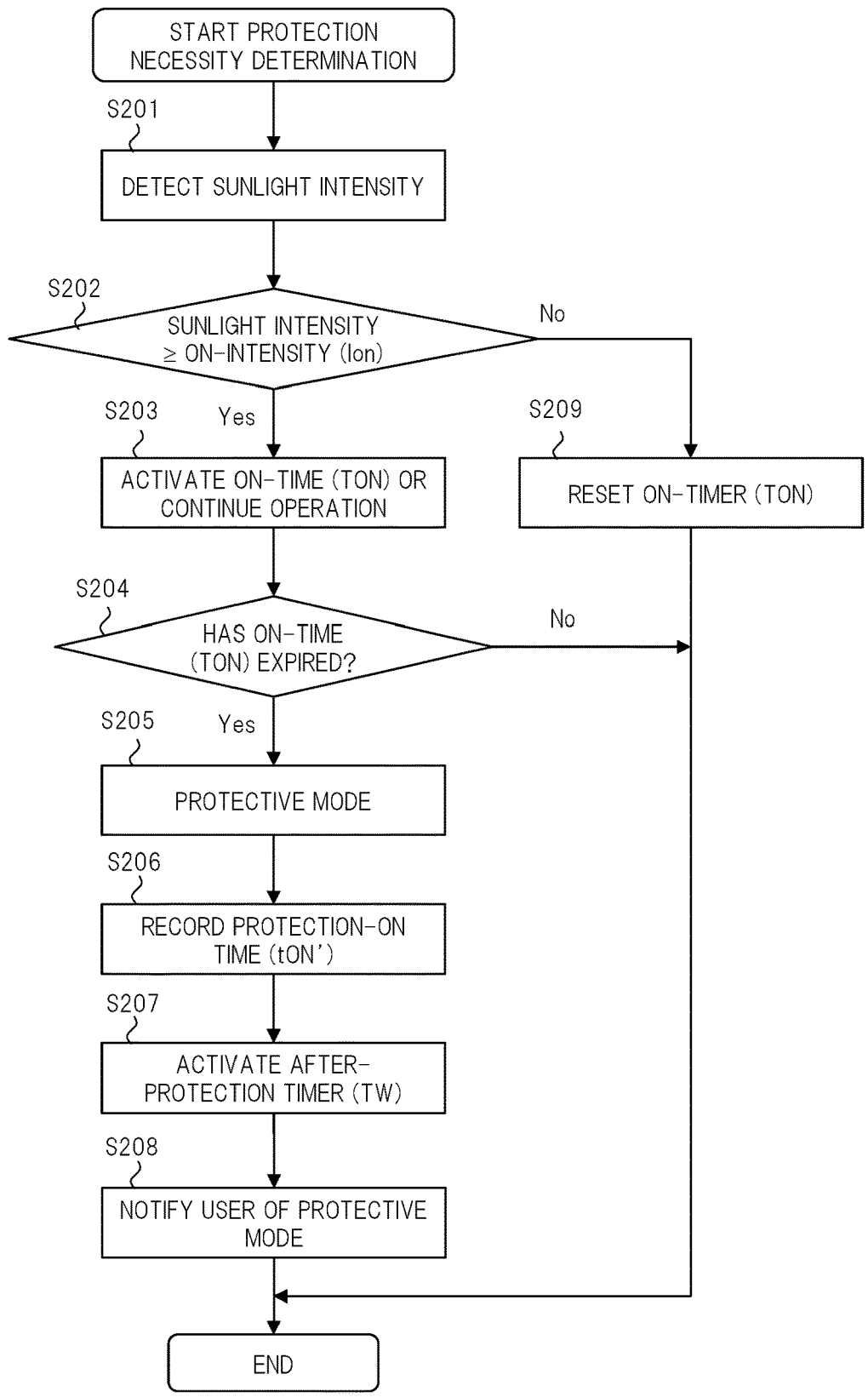
FIG. 10 is a flowchart showing an example of a processing content of protection necessity determination in FIG. 9.
Figure 11:
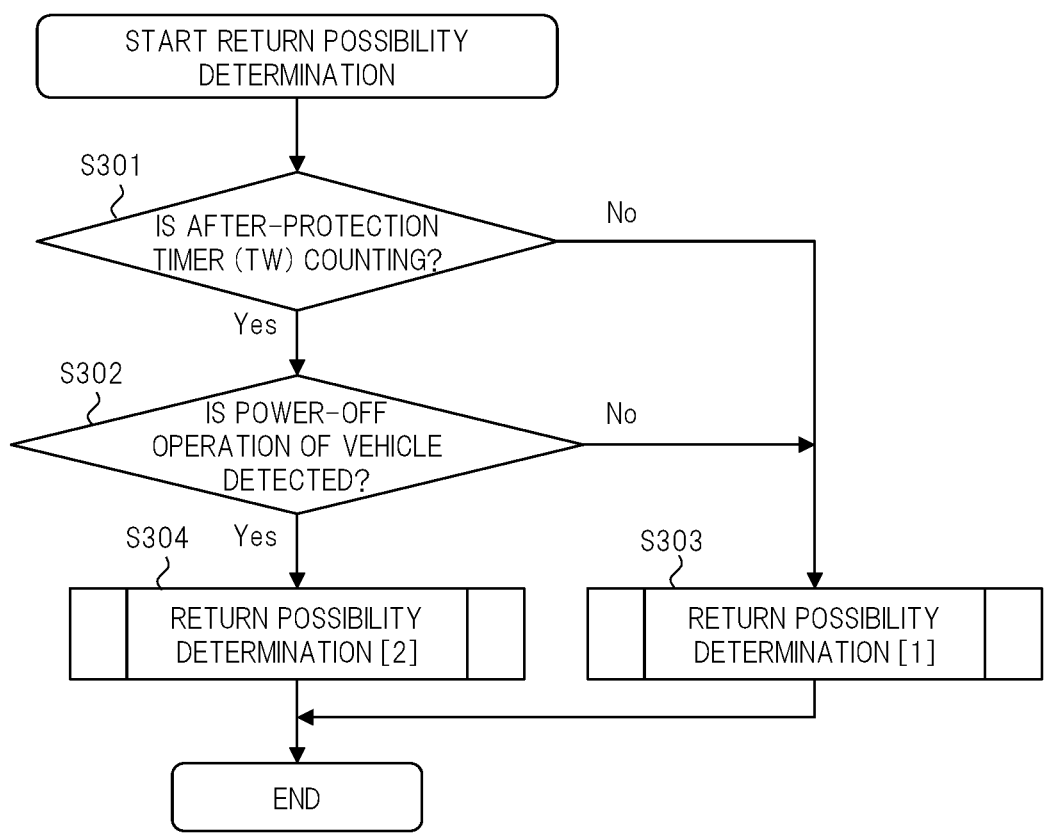
FIG. 11 is a flowchart showing an example of a processing content of return possibility determination in FIG. 9.
Figure 12:
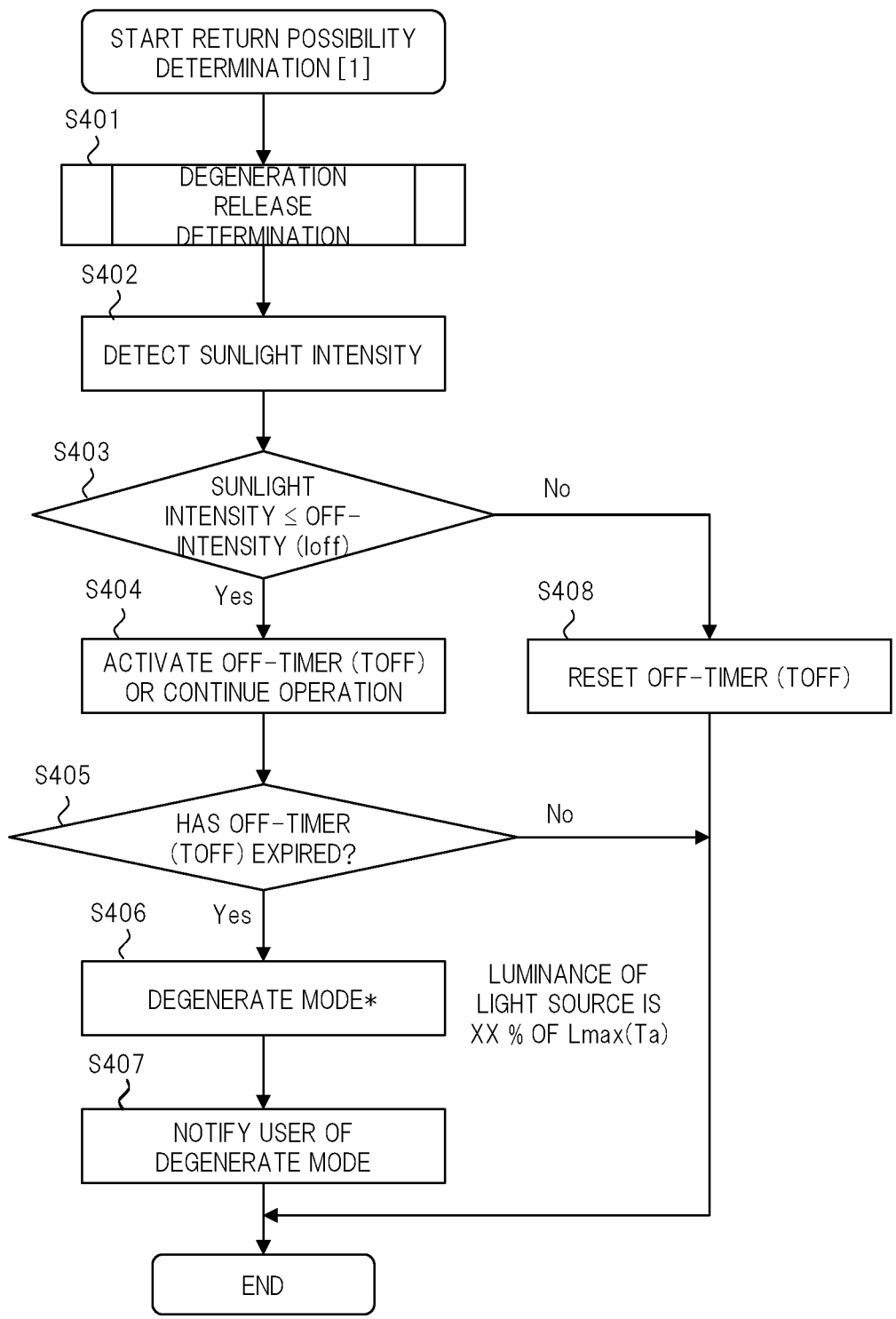
FIG. 12 is a flowchart showing an example of a processing content of return possibility determination [1] in FIG. 11.
Figure 13:
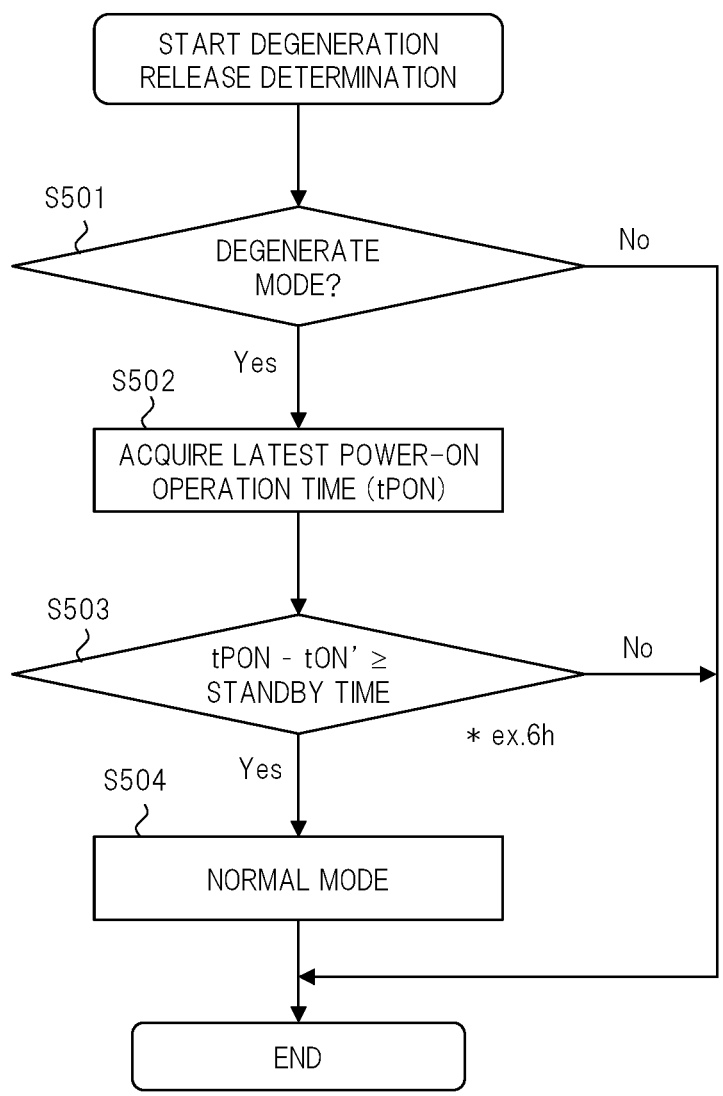
FIG. 13 is a flowchart showing an example of a processing content of degeneration release determination in FIG. 12.
Figure 14B:
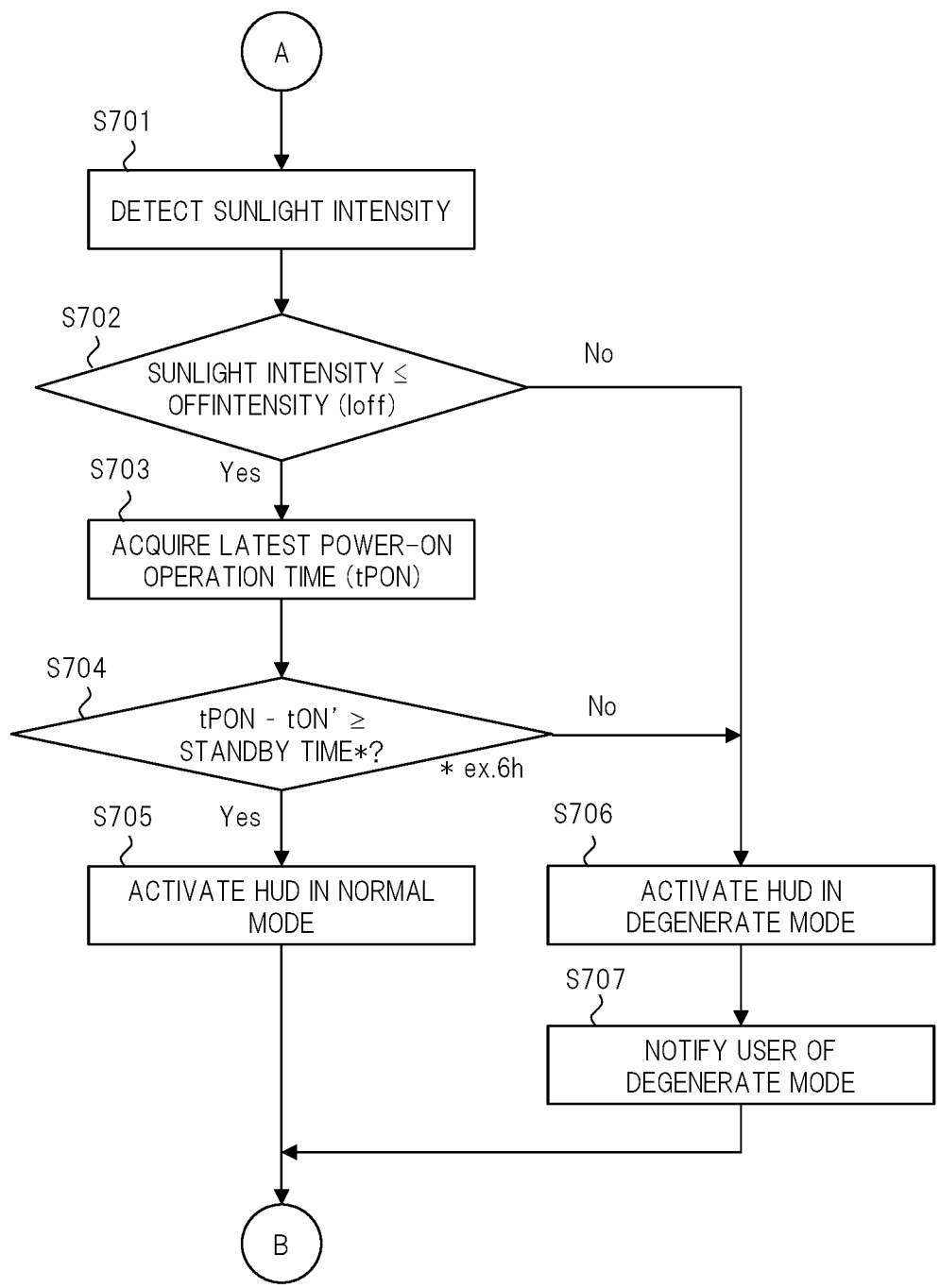
FIG. 14B is a flowchart showing an example of the processing content of the return possibility determination [2] in FIG. 11.

FIG. 9 is a flowchart showing an example of a processing content of the protection processor in FIG. 5. FIG. 10 is a flowchart showing an example of a processing content of a protection necessity determination in FIG. 9. FIG. 11 is a flowchart showing an example of a processing content of a return possibility determination in FIG. 9. FIG. 12 is a flowchart showing an example of a processing content of a return possibility determination [1] in FIG. 11. FIG. 13 is a flowchart showing an example of a processing content of a degeneracy release determination in FIG. 12. FIGS. 14A and 14B are flowcharts each showing an example of a processing content of a return possibility determination [2] in FIG. 11. These flows are repeatedly executed in a predetermined control cycle.

First, outlines of these flows will be described. As described in FIG. 7, in FIG. 10, when the sunlight intensity is in a state of the on-intensity Ion or more and when the state continues for a predetermined on-time TON, the protection processor 75 is shifted from the normal mode MN (or degenerate mode MD) to the protective mode MP. Further, in FIG. 12, as described in FIG. 7, when the sunlight intensity is in a state of a predetermined off-intensity Ioff or less and when the state continues for a predetermined off-time TOFF, the protection processor 75 is shifted from protective mode MP to the degenerate mode MD.

Here, in the degenerate mode MD, since the maximum luminance Lmax of the light source 65 is limited, it is necessary to return to the normal mode MN under some conditions. Thus, when the protection processor 75 detects that power of the vehicle 2 is turned on again (for example, an ignition switch is turned on from off) in a period after an operation in the degenerate mode MD continues for a predetermined standby time, it is shifted from the degenerate mode MD to the normal mode MN. The standby time is, for example, 3 hours or more, typically 6 hours or the like. Further, it can be determined whether the standby time has been continued, for example, by acquiring the current time from the GPS receiver 57 or the like of FIG. 6.

This standby time (6 hours) is predetermined based on, for example, a sunlight detection range 70 of FIG. 4 and a movement of the sun 60. Specifically, first, assuming that the vehicle 2 is stopped, a time zone in which the sun 60 exists in the sunlight detection range 70 in a day occurs twice within periods when the sun 60 rises and the sun 60 sets. An interval of time from a start time of the first time zone to an end time of the second time zone is calculated to be about 6 hours. In this case, sufficient time can be secured until 6 hours have passed from a time point of being shifted to the protective mode MP and then the necessity for being next shifted to the protective mode MP occurs (that is, until the necessity to consider the sunlight intensity occurs). Consequently, after 6 hours have passed, there arises no problem even if the mode is changed to the normal mode MN.

Further, if luminance suddenly changes after 6 hours have passed in a process of the driver continuing driving, the driver's consciousness is directed to it and the safety may be impaired. Thus, it becomes a condition that the power of the vehicle 2 is turned on again. Meanwhile, used may be such a method that the maximum luminance Lmax in the degenerate mode MD is gradually increased toward the maximum luminance Lmax (Ta) in the normal mode MN with time. However, in this case, a complicated processing may be required to estimate the temperature of the display panel 64. Therefore, from such a viewpoint, it is beneficial to keep the maximum luminance Lmax in the degenerate mode MD at XX % (for example, 70%) of the maximum luminance Lmax (Ta) in the normal mode MN.

Also, as an exceptional case, the driver may turn off the power of the vehicle 2 during a period of the protective mode MP. For example, if the power of the vehicle 2 is turned off immediately after the shift to the protective mode MP and the power of the vehicle 2 is turned on again immediately after that, activating it from the initial state (that is, the normal mode MN) may be unable to achieve the protection of the display panel 64. Thus, the protection processor 75 includes a timer 76 as shown in FIG. 5.

The timer 76 counts the same time as the off-time TOFF (for example, 5 minutes) from a time point of being shifted to the protective mode MP (protection on-time tON' in FIG. 7). The timer 76 continues counting by battery power even when the power of the vehicle 2 is turned off. Then, in FIG. 14A, when the power of the vehicle 2 is turned on again during a counting operation of the timer (after-protection timer TW) 76, the protection processor 75 does not cancel (release) the protective mode MP until the counting operation of the timer 76 is completed. Meanwhile, if the counting operation of the timer 76 has expired (that is, 5 minutes after the protection on-time tON'), the protection processor can cancel the protective mode MP for the same reason as that of a case of the off-time TOFF in FIG. 7.

Further, even if the power of the vehicle 2 is turned off immediately after the shift to the protective mode MP and a time when the power of the vehicle 2 is turned on thereafter is a time after the counting operation of the timer (after-protection timer TW) has expired, the protection processor does not need to maintain the protective mode MP. In this case, in FIG. 14B, the protection processor 75 determines whether the degenerate mode MD or the normal mode MD is properly used depending on whether the time tPON at which the vehicle 2 is turned on is or not a time after the above-mentioned standby time (6 hours) has elapsed.

Next, details of these processing contents will be described. In FIG. 9, the protection processor 75 first determines an operational mode (step S101). If a determination result in step S101 is the normal mode MN, the protection processor 75 performs protection necessity determination (step S102) and if the determination result in step S101 is the protective mode MP, the protection processor performs return possibility determination (step S105). At this time, the return possibility determination (step S105) is determination of whether the protective mode MP can be changed to the degenerate mode MD. Meanwhile, if the determination result in step S101 is the degenerate mode MD, the protection processor 75 performs both the protection necessity determination (step S103) and the return possibility determination (step S104). At this time, the return possibility determination (step S104) is determination of whether the degenerate mode MD can be changed to the normal mode MN.

In the protection necessity determination of FIG. 10, the protection processor 75 detects the sunlight intensity by using the solar radiation sensor 66 (step S201). Subsequently, the protection processor 75 determines whether the detected sunlight intensity is the on-intensity Ion or more (step S202). When the sunlight intensity is the on-intensity Ion or more, the protection processor 75 activates an on-timer (TON) that counts the on-time TON (step S203). The on-timer (TON) is one of the timers 76 in FIG. 5. Further, in step S203, when the on-timer (TON) is already counting, the protection processor 75 continues the counting operation. Meanwhile, in step S202, when the sunlight intensity is less than the on-intensity Ion, the protection processor 75 resets the on-timer (TON) and ends its processing (step S209).

After step S203, the protection processor 75 determines whether the on-timer (TON) has expired (step S204). When the on-timer (TON) is counting, the protection processor 75 ends the processing. Meanwhile, when the on-timer (TON) has expired, the protection processor 75 is shifted to the protective mode MP (step S205). Then, the protection processor 75 records, as the protection-on time tON', the current time acquired from the GPS receiver 57 or the like of FIG. 6 in the non-volatile memory 17 or the like of FIG. 5 (step S206). Further, the protection processor 75 activates the after-protection timer TW (step S207). The after-protection timer TW is one of the timers 76 of FIG. 5, and counts the same time as the off-time TOFF.

Figure 15:
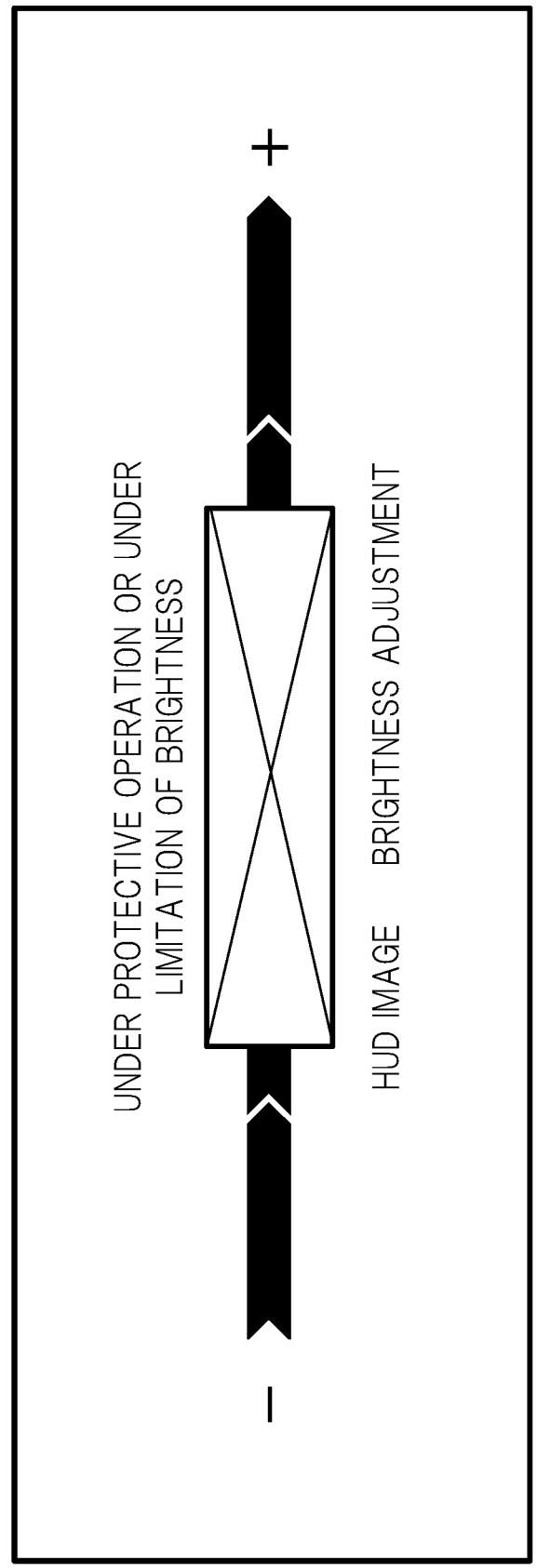
FIG. 15 is a view showing an example of a user notification content by the protection processor in FIG. 5.

Thereafter, the protection processor 75 notifies the user (driver) of the protective mode MP (step S208). That is, in the protective mode MP, since the projected image is not displayed in the display region 5, the driver's consciousness is directed to it and the safety may be impaired. Thus, for example, a warning as shown in FIG. 15 is displayed on a cluster panel or a navigation panel. FIG. 15 is a view showing an example of a user notification content by the protection processor in FIG. 5.

In an example of FIG. 15, when the driver tries to adjust brightness of a HUD image(s), contents are displayed on the cluster panel or the navigation panel, the contents being a notification indicating that their panels are under their protective operations or limitations of brightness and that the brightness of the HUD image cannot be adjusted. That is, as will be described later, such a notification is given not only in the protective mode MP but also in the degenerate mode MD. This is because the brightness of the HUD image is lowered in the degenerate mode MD, so that the safety may be impaired similarly to the case of the protective mode MP. Incidentally, such user notification is performed, for example, via the communicator 21 of FIG. 5. Further, the user notification is not limited to the display, and may be voice via the speaker 11 of FIG. 5.

In the return possibility determination of FIG. 11, the protection processor 75 determines whether a power-off operation (ignition switch off) of the vehicle 2 is detected while the after-protection timer TW is counting (steps S301, S302). When the determination results of steps S301, S302 are both "Yes", the protection processor 75 performs return possibility determination [2] (that is, exceptional determination) (step S304), and when either one of the determination results is "No", the protection processor performs the return possibility determination [1] (that is, the normal determination) (step S303).

In the return possibility determination [1] of FIG. 12, the protection processor 75 performs degeneracy release determination (step S401). Details thereof will be described later in FIG. 13, but the degenerate mode MD is maintained or the degenerate mode MD is shifted to the normal mode MN depending on the degeneration release determination. In step S402 of FIG. 12, the protection processor 75 detects the sunlight intensity by using the solar radiation sensor 66 (step S401). Subsequently, the protection processor 75 determines whether the detected sunlight intensity is the off-intensity Ioff or less (step S403).

When the sunlight intensity is the Off-intensity Ioff or less in step S403, the protection processor 75 activates an off-timer (TOFF) for counting the off-time TOFF (step S404). The off-timer (TOFF) is one of the timers 76 in FIG. 5. Further, in step S404, when the off-timer (TOFF) is already counting, the protection processor 75 continues the counting operation. Meanwhile, in step S403, when the sunlight intensity is more than the off-intensity Ioff, the protection processor 75 resets the off-timer (TOFF) and ends the processing (step S408).

After step S404, the protection processor 75 determines whether the off-timer (TOFF) has expired (step S405). When the off-timer (TOFF) is counting, the protection processor 75 ends the processing. Meanwhile, when the off-timer (TOFF) has expired, the protection processor 75 is shifted to the degenerate mode MD (step S406). Thereafter, as described in FIG. 15, the protection processor 75 notifies the user (driver) that the current mode is the degenerate mode MD (step S407).

In the degeneracy release determination of FIG. 13, the protection processor 75 determines whether the mode is the degeneracy mode MD (step S501). When the mode is not the degenerate mode MD (that is, when it is the normal mode MN), the protection processor 75 ends the processing. Meanwhile, when the mode is the degenerate mode MD, the protection processor 75 acquires a power-on operation time (ignition switch on-time) tPON of the latest vehicle 2 (step S502). Specifically, for example, when the power of the HUD apparatus 1 is turned on in response to the ignition switch being turned on, the protection processor 75 acquires a current time at its time point from the GPS receiver 57 or the like of FIG. 6, and has only to record the time in the non-volatile memory 17 or the like of FIG. 5 as the power-on operation time tPON of the vehicle 2. Alternatively, the protection processor 75 may use information from an engine start sensor 49 of FIG. 6.

Next, the protection processor 75 determines whether the power-on operation time tPON of the vehicle 2 has elapsed the standby time (for example, 6 hours) from the protection-on time tON' recorded in step S206 of FIG. 10 (Step S503). When the standby time has elapsed, the protection processor 75 is shifted to the normal mode MN (step S504). Meanwhile, if the standby time has not elapsed in step S503, the protection processor 75 maintains the degenerate mode MD by ending the processing.

In the return possibility determination [2] of FIG. 14A, the protection processor 75 waits until the power-on operation of the vehicle 2 is detected (step S601). Then, when the power-on operation of the vehicle 2 is detected, the protection processor 75 determines whether the after-protection timer TW is counting (step S602). When the after-protection timer TW is counting, the protection processor 75 waits until the after-protection timer TW expires (step S603). During this time, the protective mode MP is maintained.

Subsequently, when the after-protection timer TW expires in step S603, the protection processor 75 activates the HUD apparatus in a state set in the degenerate mode MD (that is, displays the projected image on the display region 5) in step S604. Thereafter, as described in FIG. 15, the protection processor 75 notifies the user (driver) that the current mode is the degenerate mode MD (step S605).

Meanwhile, when the after-protection timer TW is not counting in step S602 (that is, when the timer has expired), a processing as shown in FIG. 14B is performed. In FIG. 14B, the protection processor 75 detects the sunlight intensity by using the solar radiation sensor 66 (step S701). Subsequently, the protection processor 75 determines whether the detected sunlight intensity is the off-intensity Ioff or less (step S702).

When the sunlight intensity is the off-intensity Ioff or less in step S702, the protection processor 75 performs the same processings as those of steps S502 to S504 of FIG. 13 in steps S703 to S705. That is, the protection processor 75 acquires the power-on operation time tPON of the latest vehicle 2 (step S703), and detects whether the protection-on time tPON' elapses from the power-on operation time tPON for an interval of the standby time (for example, 6 hours) (step S704).

Then, when the standby time has elapsed in step S704, the protection processor 75 activates the HUD apparatus in a state set in the normal mode MN in step S705 (that is, displays the projected image on the display region 5). Meanwhile, if the standby time has not elapsed in step S704, the protection processor 75 activates the HUD apparatus in a state set in the degenerate mode MD (step S706). Thereafter, as described in FIG. 15, the protection processor 75 notifies the user (driver) that the current mode is the degenerate mode MD (step S707).

<<Main Effects of Embodiments>>

As described above, using the HUD apparatus of the embodiment typically makes it possible to prevent the damage due to the sunlight and to secure the user convenience. That is, while the display panel 64 is protected, the time zone during which the HUD cannot be used is shortened as much as possible, in other words, the time zone during which the HUD can be used (the time zone in which the projected image on the display region 5 is displayed) can be extended.

Specifically, by the sunlight intensity within the sunlight detection range 70 being detected by the solar radiation sensor 66, the time zone in which the HUD can be used can be extended without being unnecessarily shifted to the protective mode MP. Further, even when the mode is shifted to the protective mode MP and when the sunlight intensity is low, the time zone in which the HUD can be used can be extended by canceling the protective mode MP after the off-time TOFF. Furthermore, when the protective mode MP is canceled (released), the display panel 64 can be reliably protected by shifting to the degenerate mode MD instead of the normal mode MN.

In the foregoing, the invention made by the inventors of the present invention has been specifically described based on the embodiments. However, it is needless to say that the present invention is not limited to the foregoing embodiments and various modifications and alterations can be made within the scope of the present invention. For examples, the above-mentioned embodiments have been described in detail so as to make the present invention easily understood, and the present invention is not always limited to the embodiment having all of the described constituent elements. Also, a part of the configuration of one embodiment may be replaced with the configuration of another embodiment, and the configuration of one embodiment may be added to the configuration of another embodiment. Furthermore, another configuration may be added to a part of the configuration of each embodiment. Moreover, another configuration may be added to a part of the configuration of each embodiment, and a part of the configuration of each embodiment may be eliminated or replaced with another configuration.

EXPLANATION OF REFERENCE NUMERALS

1 HUD apparatus;
2 Vehicle;
3 Windshield;
4 Vehicle information;
5 Display region;
6 Driver;
7 Opening;
10 Controller (ECU);
11 Speaker;
12 Image display unit;
15 Vehicle information acquisitor;
16 Microcontroller (MCU);
17 Non-volatile memory;
18 Volatile memory;
19 Audio driver;
20 Display driver;
21 Communicator;
27 Audio data generator;
28 Image data generator;
29 Distortion corrector;
30 Light source adjuster;
31 Mirror adjuster;
35 Video display;
41 Vehicle speed sensor;
42 Shift position sensor;
43 Steering-wheel steering angle sensor;
44 Headlight sensor;
45 Illuminance sensor;
46 Chromaticity sensor;
47 Distance measuring sensor;
48 Infrared sensor;
49 Engine start sensor;
50 Acceleration sensor;
51 Gyro sensor;
52 Temperature sensor;
53 Road-to-vehicle communication wireless transceiver;
54 Vehicle-to-vehicle communication wireless transceiver;
55 In-vehicle Camera;
56 Vehicle-outside camera;
57 GPS receiver;
58 VICS receiver;
60 Sun;
61 Housing;
62 Drive mechanism;
63 Condenser lens;
64 Display panel;
65 Light source;
66 Solar radiation sensor;
67 Blocking mechanism;
70 Sunlight detection range;
71 Cover member;
75 Protective processor;
76 Timer;
IOff off-intensity;
Ion on-intensity;
M1, M2 Reflection mirrors;
MD Degenerate mode;
MN Normal mode;
MP Protective mode;
TOFF Off-time;
TON On-time;
Ta Ambient temperature; and
tON' Protection-on time.

The invention claimed is:

1. A head-up display apparatus projecting an image onto a display region of a windshield and allowing a driver of a vehicle to visually recognize a landscape on which the image is superimposed, the head-up display apparatus comprising:
- a light source emitting light;
- a display panel creating an image to be projected onto the display region by modulating the light from the light source;
- a reflection mirror reflecting the image created by the display panel to project it onto the display region;
- a solar radiation sensor detecting a sunlight intensity; and
- a protection processor,
- wherein a normal mode, a degenerate mode, and a protective mode are provided as operational modes, in the normal mode a luminance of the light source being not limited, in the degenerate mode the luminance of the light source being limited to a value lower than that in the normal mode, and in the protective mode driving of the light source being stopped,
- wherein the protection processor is configured to control the operational modes based on the sunlight intensity detected by the solar radiation sensor, and
- wherein the protection processor includes a timer that counts elapsed time from a time point when being shifted to the protective mode.

2. The head-up display apparatus according to claim 1,
wherein a drive mechanism changing an installation angle is attached to the reflection mirror, and
wherein, during the protective mode, changing the installation angle of the reflection mirror via the drive mechanism causes a projected light path of the image between the display region and the display panel and an incident light path of the sunlight to be blocked.

3. The head-up display apparatus according to claim 1,
wherein the protection processor is configured to shift from the protective mode to the degenerate mode when the sunlight intensity is in a state of a predetermined intensity or less and the state continues for a predetermined time.

4. The head-up display apparatus according to claim 1,
wherein the protection processor is configured to shift from the degenerate mode to the normal mode when detecting that power of the vehicle is again turned on in a period after an operation in the degenerate mode continues for a predetermined standby time.

5. The head-up display apparatus according to claim 1,
wherein the protection processor is configured to variably control the maximum luminance of the light source in the degenerate mode according to the ambient temperature.

6. The head-up display apparatus according to claim 1,
wherein the protection processor is configured to shift from the normal mode or the degenerate mode to the protective mode when the sunlight intensity is in a state of a predetermined intensity or more and the state continues for a predetermined time.

7. The head-up display apparatus according to claim 1,
wherein the protection processor is configured to notify a user of the degenerate mode or the protective mode during the degenerate mode and during the protective mode, respectively.

* * * * *